United States Patent Office 2,981,708
Patented Apr. 25, 1961

2,981,708

RAPID DRYING ALKYD COATING EMPLOYING 3-HYDROXY-2-NAPHTHOIC ACID

Raymond L. Heinrich, Baytown, Tex., and David A. Berry, Columbus, and Robert L. Christian, Gahanna, Ohio, assignors, by mesne assignments, to Esso Research and Engineering Company, Elizabeth, N.J., a corporation of Delaware No Drawing. Filed Oct. 26, 1959, Ser. No. 848,524

3 Claims. (Cl. 260—22)

This invention relates to modified alkyld resins. More particularly, this invention relates to modified alkyd resins of improved hardness and drying characteristics.

Alkyd resins are widely used in the preparation of surface coating compositions. A particularly desired class of alkyd resins are the so-called "oil modified" alkyd resins employed in coatings and prepared by the intercondensation of a polybasic acid (preferably dibasic), a polyol, and an unsaturated fatty acid derived from a glyceride oil.

The present invention is directed to a discovery in the field of oil-modified alkyd resins which not only permits the inclusion of 3-hydroxy-2-naphthoic acid as a raw material but which also provides oil-modified alkyd resins of improved physical and chemical properties.

It has now been discovered that alkyd resin compositions of improved physical properties may be obtained by replacing from about 20 to about 80 mol percent of the fatty acid component of the alkyd resin with 3-hydroxy-2-naphthoic acid. In particular, the alkyd resin coating compositions of the present invention are characterized by satisfactory drying times and the films prepared therefrom are characterized by excellent flexibility and hardness.

Alkyd resin chemistry is well known to those skilled in the art and, in the interest of brevity, will not be discussed in detail. The preparation and physical properties of alkyd resins are described in numerous texts, such as vol. I to "Organic Coating Technology," Henry Fleming Payne, John Wiley and Sons, Inc., N.Y., 1954.

The polycarboxylic acids used in the preparation of the novel alkyds may be any of those generally employed in the preparation of this type of resin. These acids may possess two, three, four or more carboxyl groups and may be aliphatic, alicyclic, heterocyclic, or aromatic and may be saturated or unsaturated. Examples of such acids are malonic, glutaric, succinic, suberic, citric, tricarballylic, cyclohexandicarboxylic, maleic, fumaric, itaconic, citraconic, mesaconic, phthalic, isophthalic, terephthalic, 1,8-naphthalic, adipic, sebacic, azeleic, pimelic, chlorosuccinic, bromomaleic, dichlorophthalic, etc.

The preferred polycarboxylic acids to be used in producing the novel alkyds are the dicarboxylic acids containing from 2 to 10 carbon atoms, such as succinic, glutaric, adipic, suberic, maleic, phthalic, isophthalic, and the like. Particularly preferred polycarboxylic acids are the aromatic dicarboxylic acids, containing from 6 to 10 carbon atoms wherein the two carboxyl groups are attached directly to the aromatic nucleus.

In some cases it may be desirable to utilize other forms of the acids, such as the acid anhydrides or acid chlorides, as phthalic anhydride, maleic anhydride, isophthaloyl chloride, and the like.

The esters of the polybasic acids may be utilized in case the alkyds are to be produced by an ester exchange reaction. Preferred derivatives to be used for this purpose comprises the esters of the above-described acids and the lower saturated monohydric alcohols, preferably those containing from 1 to 5 carbon atoms, such as methyl alcohol, ethyl alcohol, and amyl alcohol.

The polyhydric alcohols used in the preparation of the alkyds of the invention are those containing at least three esterifiable hydroxyl groups. Illustrative examples of such alcohols are glycerol, polyglycerol, pentaerythritol, mannitol, trimethylolpropane, 1,2,6-hexanetriol, dipentaerythritol, polyallyl alcohol, polymethallyl alcohol, polyols formed by the condensation of bis-phenols with epichlorohydrin, and the like.

Preferred polyhydric alcohols to be used in the preparation of the alkyds are the aliphatic alcohols possessing from 3 to 6 hydroxyl groups and containing from 3 to 14 carbon atoms, such as glycerol, pentaerythritol, manitol, 1,4,6-octanetriol, and 1,3,5-hexanetriol.

The polyhydric alcohol (polyol) should contain an average of from about 2.5 to about 4.5 hydroxyl groups per molecule and, preferably, about 3 hydroxyl groups per molecule.

A wide variety of unsaturated fatty acids may be utilized in the preparation of modified alkyd resins, the source of the fatty acid normally being a naturally occurring vegetable or marine oil. Thus, there may be used the polyethylenic acids derived from the drying oils, and their derivatives, such as their esters, amides and the like. Examples of these acids and derivatives include the acids derived from oils such as linseed, soyabean, perilla, oitica, tung, walnut, and dehydrated castor oil, as linoleic, linolenic, 9,12-octadecadienoic, 9,12,15-octadecatrienoic, and eleostearic acid; the monohydric alcohol esters of the drying oil acids, such as methyl eleostearate, butyl eleostearate, ethyl 9-12-octadecadienoate, butyl 9,12,15-octadecatrienoate, and octyl 9,12,-octadecadienoate; the glycerides of the fatty acids of the drying oils, such as the monoglyceride of the linseed oil acids, the digylceride of the soyabean acids, the monoglyceride of the tung oil acids, and the drying oils themselves, such as tung oil, soyabean oil, hempseed, sardine, and the like.

The preferred modifiers comprise the drying oil fatty acids and their mono- and diglycerides. Particularly preferred modifiers are the drying oil fatty acids containing at least 12 carbon atoms.

If desired, other modifiers in addition to those described above may be utilized in the preparation of the novel alkyds. Such modifiers include the protein plastics, natural resins as rosin, synthetic resins as the nitro-cellulose, phenol-formaldehyde, urea-formaldehyde and melamine type resins, synthetic resins obtained by the addition polymerization of unsaturated compounds, such as styrene, alpha-methylstyrene, vinyl chloride, vinylidene chloride, vinyl acetate, methyl acrylate, methyl methacrylate, and the like, as well as mixtures thereof.

In general, the polybasic acid, polyol, and fatty acid are interreacted in proportions sufficient to provide about a 5 to 25 weight percent excess of polyol. Excess polyol may be defined as that amount of polyol in excess of the amount necessary to combine with the sum of the acid groups in the fatty acid and the polybasic acid on a theoretical basis. Alkyd resins are conventionally characterized as short oil alkyd resins, medium oil alkyd resins, and long oil alkyd resins depending upon the ratio of fatty acid to the dibasic acid in the preparation of the resin. Long oil alkyd resins are normally prepared by the interreaction of about 3.1 to about 3.4 mol equivalents of polyol with about 2 mol equivalents of polycarboxylic acid and 1 mol equivalent of unsaturated fatty acid. Progressively larger amounts of polycarboxylic acid and progressively smaller amounts of unsaturated fatty acid are utilized to provide for a shorter oil length. Thus, short oil alkyd resins may be prepared by the intercondensation of about 3.1 to about 3.4 mol equivalents of polyol with about 2.3 to about 2.5 mol equivalents of polycarboxylic acid and from about 0.7 to about 0.5 mol equivalent of unsaturated fatty acid.

Accordingly, the alkyd resin compositions of the present invention may be defined as intercondensation products of about 3.1 to about 3.4 mol equivalents of a polyol containing about 2.5 to 4.5 hydroxyl groups per molecule with about 1 to about 0.5 mol equivalent of a modifier consisting of about 20 to 80 mol percent of an unsaturated fatty acid and, correspondingly, from about 80 to 20 percent of 3-hydroxy-2-naphthoic acid. Thus, improved short oil, medium oil and long oil alkyd resins are provided in accordance with the present invention. The improvement is most pronounced with long oil alkyd resins.

The invention will be further illustrated by the following specific examples which are given by way of illustration and not as limitations on the scope of this invention.

tive humidity; the baked films were cured at 250° F. for 30 minutes. The films were tested for their physical properties.

In Table I there is listed the aromatic monocarboxylic acid modifiers employed, the extent to which the fatty acid was replaced with the acid modifier on a mol percent basis, and the weight percent of acid modifier utilized, based upon the total charge. In addition, the drying time of the alkyd resins prepared in the above-described fashion is given, together with the hardness of films prepared by drying of the alkyd resin compositions. The drier concentration employed for the air drying tests was about 0.5 weight percent of lead and about 0.05 weight percent of cobalt, based on the weight of the resin solids, and was added to the alkyd resin as a solution of cobalt and lead naphthenate. For the baked film tests, the cobalt salt was employed in an amount sufficient to provide 0.02 weight percent cobalt.

*Table I.—Polycyclic aromatic monocarboxylic acids as modifiers in soya-phthalic anhydride-glycerine alkyds* [1]

| Modifier acid | None | Alpha-naphthoic | | | Beta-naphthoic | | |
|---|---|---|---|---|---|---|---|
| Mol percent replacement of fatty acid | 0 | 40 | 50 | 60 | 40 | 50 | 60 |
| Weight percent modifier | 0 | 16.1 | 20.6 | 20.6 | 16.1 | 20.6 | 25.6 |
| Dry time, tack free, hours | 100 | 23 | 24 | 4.5 | 23½ | 5½ | 5½ |
| Sward hardness: | | | | | | | |
| Bake | 10 | 12 | 12 | 22 | 14 | 16 | 22 |
| Air dry, 28 days | 2 | 18 | 18 | 28 | 18 | 16 | 28 |
| Flexibility | Pass | Pass | Pass | Pass | Pass | Pass | Pass |
| Chemical resistance: | | | | | | | |
| Bake | Poor | Good | Good | Good | Good | Good | Good |
| Air dry | Poor | Fair | Fair | Good | Fair | Fair | Good |

| Modifier acid | 1-hydroxy-2-naphthoic | | | 3-hydroxy-2-naphthoic | |
|---|---|---|---|---|---|
| Mol percent replacement of fatty acid | 40 | 50 | 60 | 50 | 60 |
| Weight percent modifier | 17.5 | 22.3 | 27.3 | 22.3 | 27.0 |
| Dry time, tack free, hours | (2) | (2) | (2) | 0.25 | (3) |
| Sward hardness: | | | | | |
| Bake | | | | 36 | 40 |
| Air Dry, 28 days | | | | 60 | 42 |
| Flexibility | | | | Pass | Pass |
| Chemical resistance: | | | | | |
| Bake | | | | Good | Good |
| Air dry | | | | Good | Good |

[1] Approximately 62 percent oil length.
[2] Would not dry.
[3] 10 minutes.

EXAMPLE I

A plurality of alkyd resins were prepared utilizing phthalic anhydride, glycerol, soya fatty acids and, except for the base resin, an aromatic monocarboxylic acid. The amount of fatty acid utilized in preparing each of the resins being determined by the extent to which the fatty acid was to be replaced, on a molar basis, by the aromatic monocarboxylic acid. About a 6 to 7 percent molar excess of glycerol was used in order to obtain equivalent degrees of polymerization.

All the ingredients were charged at once to a flask fitted with a reflux condenser connected to a Dean Stark tube. The charge was heated to a temperature of about 450° F. over a 3 to 4 hour period and maintained at this temperature for about 5 to 3 hours. An atmosphere of refluxing xylene vapor was maintained over the cook and vigorous agitation was employed. Water was azeotropically removed as evolved during the course of the reaction.

At the end of the reaction, the alkyd resin was diluted while hot with solvent xylenes to provide alkyd resin formulations containing about 40 to 60 weight percent of resin solids. After cooling, air-dried films having a thickness of about 0.001 inch and baked films of about 0.0005 inch thickness were formed from the resin without the use of extraneous driers. The air-dried films were prepared and cured at 75° F. and 50 percent rela- From Table I it will be observed that improved results were obtained with the 3-hydroxy-2-naphthoic acid of the present invention as contrasted with the results obtained in using alpha or beta naphthoic acid or 1-hydroxy-2-naphthoic acid.

One surprisingly unexpected result is the extremely short dry time required for the alkyd of the present invention. Note that the alkyd dried to a tack-free condition in only 10 to 15 minutes.

In addition, it will be observed that the hardness characteristics of the alkyd resins of the present invention were substantially better than the reference alkyds, particularly with reference to air dry hardness.

EXAMPLE II

A program was designed to include a wide spectrum of alkyd types in order to determine the effectiveness of 3-hydroxy-2-naphthoic acid as an alkyd modifier under a variety of conditions. The equivalent ratio of reactants in the formulations before replacement of a portion of the fatty acid with the aromatic monocarboxylic acid was as follows:

|  | Equivalents |
|---|---|
| Dibasic acid | 9 |
| Polyol | 10 |
| Fatty acid | 10 |

The composition of the alkyd resins that were prepared is set forth in Table II.

Table II.—Composition of alkyd resins containing 3-hydroxy-2-naphthoic acid as a modifier

| Formula | 15259-61 | 15259-62 | 15259-63 | 15259-64 | 15259-65 | 15259-66 | 15259-69 |
|---|---|---|---|---|---|---|---|
| Dibasic acid: | | | | | | | |
| Type | Isophthalic | Phthalic | Phthalic | Phthalic | Phthalic | Phthalic | Phthalic. |
| Equivalent ratio | 18 | 18 | 38 | 18 | 18 | 10 | 18. |
| Grams | 53.8 | 79.1 | 80.6 | 72.6 | 44.2 | 73.0 | 84.5. |
| Percent | 21.5 | 31.7 | 32.2 | 29.1 | 17.7 | 29.3 | 33.8. |
| Polyol: | | | | | | | |
| Type | Pentaerythritol | Glycerine | Glycerine | Glycerine | Pentaerythritol | Glycerine | Glycerine. |
| Equivalent ratio | 40 | 30 | 60 | 30 | 40 | 18 | 30. |
| Grams | 51.8 | 57.5 | 55.6 | 52.8 | 47.8 | 57.4 | 61.4. |
| Percent | 20.7 | 23.0 | 22.2 | 21.1 | 19.1 | 23.0 | 24.6. |
| Fatty acids: | | | | | | | |
| Type | Soya | Soya | Soya | Soya | Soya | Soya | Coconut. |
| Equivalent ratio | 10 | 4 | 10 | 8 | 16.3 | 3 | 5. |
| Grams | 101.3 | 66.6 | 80.5 | 122.8 | 152.5 | 83.2 | 66.2. |
| Percent | 40.5 | 26.7 | 32.2 | 49.1 | 61.0 | 33.3 | 26.5. |
| Modifier, equivalent ratio | 10 | 6 | 10 | 2 | 3.6 | 3 | 5. |
| Grams | 67.8 | 67.0 | 53.8 | 20.5 | 22.9 | 55.5 | 59.6. |
| Percent | 27.1 | 26.8 | 21.5 | 8.2 | 9.2 | 22.5 | 23.8. |

The first column (15259-61) represents a formulation characterized by rapid dry time. The second column in Table II (15259-62) represents a formulation in which 60 percent of the equivalents of fatty acids in the basic formulation given above are substituted with 3-hydroxy-2-naphthoic acid. The third column (15259-63) shows a formulation in which the usual amount of excess polyol has been decreased to one-half the original value. Theoretically, this doubles the molecular weight of the resin. Also, one-half of the equivalents of fatty acid in the basic formulation have been replaced by 3-hdroxy-2-naphthoic acid. The fourth column (15259-64) represents the basic alkyd formulation in which only 20 percent of the fatty acid equivalents has been replaced with the modifier, while the next resin (15259-65) is an alkyd containing approximately 65 percent oil. This is a close duplication of a popular alkyd for general use. Formula 15259-66 is the basic formulation in which the excess polyol was increased to give a theoretical degree of polymerization of six. One-half of the equivalent fatty acids in the basic structure were replaced by 3-hydroxy-2-naphthoic acid. The final resin (15259-69) was a nondrying type containing coconut fatty acids as the oil component.

In general, all the resins were cooked at 450° F. after a 3 to 4-hour upheat period. No gelation problems were encountered with any of the resins.

Unpigmented films of the modified alkyds were evaluated in the described manner. The results of these tests are given in Table III. Rapid dry was obtained in several instances. For example, formula 15259-61 required only 12 minutes to dry tack-free, while formula 15259-62 required 20 minutes to reach the same condition. In almost every instance, the dry time of the alkyds decreased as the percentage of aromatic modifier increased. This is due partially to the corresponding decrease in oil content, but in most cases the tack-free time is much less than would normally be expected with alkyds of similar oil percentage. Thus, the activity of 3-hydroxy-2-naphthoic acid as an alkyd modifier is shown quite dramatically. In every instance the modified alkyds showed satisfactory flexibility characteristics. This test consisted of a bend over a ⅛-inch mandrel without film failure occurring. The hardness values of the films were good.

The alkyds were then pigmented by grinding them individually in ceramic ball mills with titanium dioxide pigment (R-610; 1:1 ratio of pigment to resin solids). The pigmented resin solutions were diluted to spray viscosities and applied to primed metal panels. They were evaluated in the usual manner. The results of the evaluations are given in Table IV.

The pigmented resins derived of formulas 15259-69 and 15259-63 were also evaluated after being modified with a melamine resin. The first resin is a nondrying type. It was modified by adding 15 percent of a commercial melamine resin based on total resin solids. A commercial nondrying alkyd was used as a control. The alkyd of formula 15259-63 was modified by adding 30 percent (based on resin solids) of the melamine resin and another commercial resin was used as a control. The results of the evaluation of these materials are given in Table V.

TABLE III.—Evaluation of unpigmented alkyd resins containing 3-hydroxy-2-naphthoic acid as a modifier

| Formula | 15259-61 | 15259-62 | 15259-63 | 15259-64 | 15259-65 | 15259-66 |
|---|---|---|---|---|---|---|
| Solution properties: | | | | | | |
| Solvent | Ethyl acetate | Xylene | Xylene | Xylene | Mineral spirits | Xylene. |
| Solids, percent | 50 | 60 | 60 | 60 | 60 | 60. |
| Viscosity | K | Z | W | B | E | G. |
| Color | 11 | 10 | 8 | 7 | 10 | 10. |
| Dry Time [1], hours: | | | | | | |
| Cotton-free | 1 min | 5 min | 0.25 | 0.75 | 3.5 | 0.25. |
| Tack-free | 12 min | 20 min | 1 | 3 | 8 | 1.5. |
| Sward hardness: | | | | | | |
| Bake [2] | 38 | 40 | 42 | 18 | 22 | 36. |
| Air dry: [1] | | | | | | |
| 48 hours | 32 | 34 | 36 | 12 | 10 | 24. |
| 7 days | 44 | 50 | 50 | 18 | 16 | 36. |
| 28 days | 48 | 52 | 50 | 24 | 20 | 40. |
| Chemical resistance: [3] | | | | | | |
| Bake | Good | Good | Good | Poor | Fair | Good. |
| Air dry | do | do | do | do | Poor | Fair. |

[1] Evaluated when using 0.05 percent cobalt and 0.5 percent lead as naphthenates based on resin solids.
[2] Evaluated when using 0.02 percent cobalt as naphthenate based on resin solids. Baked at 250° F. for ½ hour.
[3] Rating based on resistance to hot and cold water and to dilute alkali.

TABLE IV.—*Evaluation of pigmented alkyd resins containing 3-hydroxy-2-naphthoic acid as a modifier*

| Formula | 15259-61 | 15259-62 | 15259-63 | 15259-64 | 15259-65 | 15259-66 |
|---|---|---|---|---|---|---|
| Dry time,[1] hours: | | | | | | |
| Cotton-free | a 4 | a 5 | a 5 | 3 | 3 | 5 |
| Tack-free | 0.5 | 0.5 | 2 | 8 | 5.5 | 5.5 |
| Sward hardness: | | | | | | |
| Bake [2] | 18 | 26 | 20 | 4 | 8 | 10 |
| Air dry,[1] 7 days | 30 | 28 | 28 | 10 | 18 | 26 |
| Gloss, 20° meter: | | | | | | |
| Bake [2] | 77 | 90 | 94 | 78 | 75 | 95 |
| Air dry [1] | 40 | 60 | 69 | 90 | 82 | 100 |

[1] Evaluated when using 0.05 percent cobalt and 0.5 percent lead based on resin solids.
[2] Evaluated when using 0.02 percent cobalt based on resin solids.
a Minutes.

TABLE V.—*Evaluation of pigmented, baked melamine alkyds containing 3-hydroxy-2-naphthoic acid as a modifier*

| Formula | 15259-63 | Control | 15259-69 | Control |
|---|---|---|---|---|
| Melamine resin, percent | 30 | 30 | 15 | 15 |
| Chemical resistance | Good | Good | Good | Good |
| Xylene resistance | Good | Good | Good | Good |
| Hardness | 26 | 40 | 38 | 24 |
| Gloss | 14 | 17 | 5 | 18 |

Having described our invention, what is claimed is:

1. An alkyd resin composition comprising the intercondensation product of about 3.1 to about 3.4 mol equivalents of a polyol containing an average of from about 2.5 to 4.5 hydroxyl groups per molecule with from about 2 to 2.5 mol equivalents of a polycarboxylic acid and, correspondingly, from about 1 to about 0.5 mol equivalent of a modifier component consisting of about 20 to 80 mol percent of an unsaturated fatty acid and, correspondingly, about 80 to 20 mol percent of 3-hydroxy-2-naphthoic acid.

2. An alkyd resin coating composition as in claim 1 wherein the polyol is glycerol and the dicarboxylic acid is a phthalic acid.

3. An alkyd resin coating composition as in claim 1 wherein the polyol is pentaerythritol and the dicarboxylic acid is a phthalic acid.

References Cited in the file of this patent

UNITED STATES PATENTS

| | | |
|---|---|---|
| 2,197,855 | Ellis | Apr. 23, 1940 |
| 2,618,616 | Tess et al. | Nov. 18, 1952 |